United States Patent Office 3,450,698
Patented June 17, 1969

3,450,698
PHENTHIAZINE DERIVATIVES
Daniel Farge, Thiais, Claude Jeanmart, Brunoy, and Mayer Naoum Messer, Sceaux, France, assignors to Rhone-Poulenc S.A., Paris, France, a French body corporate
No Drawing. Filed Oct. 25, 1965, Ser. No. 505,428
Claims priority, application France, Oct. 29, 1964, 993,221, 993,222; Oct. 30, 1964, 993,385; Dec. 28, 1964, 101; Sept. 24, 1965, 32,594, 32,595, 32,596
Int. Cl. C07d 93/14, C07c 149/42; A61k 27/00
U.S. Cl. 260—243                                    9 Claims

ABSTRACT OF THE DISCLOSURE

α-(3-phenthiazinyl) lower alkanoic acids are useful anti-inflammatory agents.

This invention relates to new therapeutically useful phenthiazine derivatives, to processes for their preparation and pharmaceutical compositions containing them.

According to the present invention, there are provided the new phenthiazine derivatives of the general formula:

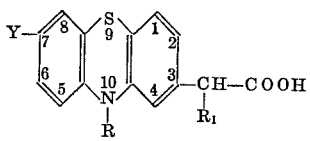

wherein R represents a hydrogen atom or a methyl group, $R_1$ represents a hydrogen atom or a methyl or ethyl group, and Y represents a hydrogen or halogen atom, or an alkyl, alkoxy or alkylthio group having 1 to 4 carbon atoms, R representing a methyl group when $R_1$ and Y both represent hydrogen atoms, and salts thereof, for example alkali metal, alkaline earth metal, ammonium and amine salts. The new phenthiazine compounds possess useful pharmacodynamic properties; in particular, they are particularly useful as anti-inflammation and anti-rheumatic agents and have given good results as such in physiological experiments with animals when used in doses of 10 to 100 mg. per kilogramme weight of animal. Compounds of importance are those of Formula I in which R and $R_1$ each represent a hydrogen atom or a methyl group and Y is as hereinbefore defined and, more particularly, (10-methyl - 3 - phenthiazinyl)acetic acid, (7 - methoxy-10-methyl - 3 - phenthiazinyl)acetic acid, 2 - (10-methyl-3-phenthiazinyl)propionic acid and 2 - (7 - methoxy - 10-methyl-3-phenthiazinyl)propionic acid.

According to a feature of the invention, the phenthiazine derivatives of Formula I, in which $R_1$ represents a hydrogen atom, are prepared by the process which comprises subjecting a 3-acetylphenthiazine of the formula:

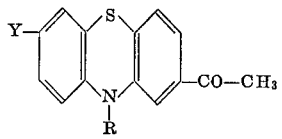

(wherein R and Y are as hereinbefore defined) to the Willgerodt reaction or Kindler modification of it, and hydrolyzing by methods known per se the amide or thioamide thus formed.

It is particularly advantageous to subject the 3-acetyl-phenthiazines to the Willgerodt-Kindler reaction using sulphur and morpholine as reagents and to operate at the reflux temperature of the reaction mixture. In this way phenthiazine intermediates of the formula:

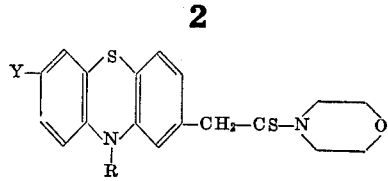

(wherein R and Y are as hereinbefore defined) are obtained, which can then be hydrolyzed to the acids of Formula I, preferably by treatment with potassium hydroxide.

The 3-acetylphenthiazine starting materials of Formula II, in which R represents a hydrogen atom, can be prepared by hydrolyzing 3,10-diacetylphenthiazines of the formula:

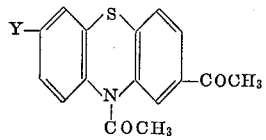

(in which Y is as hereinbefore defined) in acid medium.

The 3,10-diacetylphenthiazines of Formula IV can be prepared from phenthiazine derivatives of the formula:

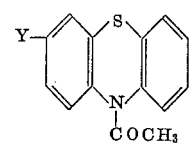

(wherein Y is as hereinbefore defined) using the Friedel-Crafts reaction employing acetyl chloride in a solvent, such as benzene or carbon disulphide, in the presence of aluminium chloride.

The phenthiazine derivatives of Formula V can be prepared by acetylation by methods known per se of phenthiazines of the formula:

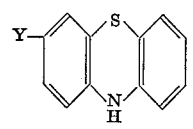

(wherein Y is as hereinbefore defined), preferably using acetic anhydride as the acetylating agent.

The 3-acetylphenthiazine starting materials of Formula II, in which R represents a methyl group, can be prepared by reacting a reactive ester of the Formula Z—$CH_3$ (wherein Z represents the acid residue of a reactive ester such as a halogen atom or a sulphuric, for example methoxysulphonyloxy, or sulphonic, for example methanesulphonyloxy or toluene-p-sulphonyloxy, residue) with a phenthiazine of the formula:

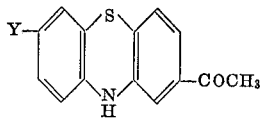

(wherein Y is as hereinbefore defined) itself obtained by hydrolysis of a 3,10-diacetylphenthiazine of Formula IV as aforementioned, or by the application of any other known method for preparing 3-substituted-phenthiazines such as the cyclisation of a 2-amino-4-acetyl-2'-bromo-diphenylsulphide carrying in the 5'-position a substituent Y as hereinbefore defined.

The reaction between the ester of Formula Z—$CH_3$ and the phenthiazine of Formula VII is preferably carried out by heating the reactants in an organic solvent such as a lower alkanol.

According to a further feature of the present invention, the phenthiazine derivatives of Formula I, in which $R_1$ represents a methyl or ethyl group, are prepared by the process which comprises hydrolyzing and simultaneously decarboxylating a phenthiazine compound of the general formula:

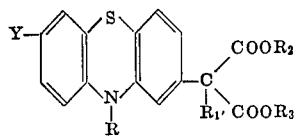
VIII wherein $R_{1'}$ represents a methyl or ethyl group, $R_2$ and $R_3$ each represent an alkyl group containing 1 to 4 carbon atoms, and R and Y are as hereinbefore defined. The process is effected by the usual methods for the hydrolysis and simultaneous decarboxylation of malonic esters; it is advantageous to use sodium hydroxide as reagent and ethanol as solvent medium.

The phenthiazine compounds of Formula VIII can be prepared by reacting a reactive ester of the formula $Z-R_{1'}$ with a phenthiazinylmalonate of the formula:

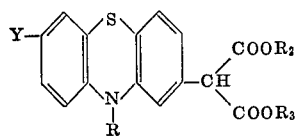
IX the various symbols being as hereinbefore defined. The reaction can be carried out by usual methods for the alkylation of malonic esters, i.e. by operating in the presence of a basic condensing agent such as an alkali metal alkoxide, alkali metal amide, or alkali metal, in an organic solvent such as benzene, toluene, ethanol or diethyl ether.

The phenthiazinylmalonates of Formula IX can be prepared from phenthiazine derivatives of the formula:

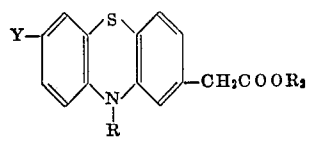
X (wherein R, $R_2$ and Y are as hereinbefore defined) either directly by the action of an alkyl carbonate of the formula $R_3-O-CO-O-R_3$ (wherein $R_3$ is as hereinbefore defined) or by the action of an alkyl oxalate of the formula $(COOR_3)_2$, $R_3$ being as hereinbefore defined, followed by decarbonylation of the resultant product.

The phenthiazine derivatives of Formula X can be prepared by esterification of phenthiazine derivatives of Formula I in which $R_1$ represents a hydrogen atom.

According to a still further feature of the invention, the phenthiazine derivatives of Formula I are prepared by hydrolyzing by methods known per se a phenthiazine of the general formula:

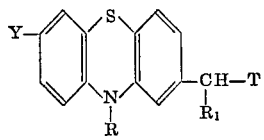
XI wherein R, $R_1$ and Y are as hereinbefore defined and T represents a radical known to be capable of conversion to a carboxy group by hydrolysis, such as a lower alkoxycarbonyl group, cyano, or a carbamoyl group. The hydrolysis is carried out under the usual conditions for the preparation of acids by hydrolysis of such precursor groups, in acid or alkaline medium as appropriate.

The phenthiazine starting materials of Formula XI can be prepared by the following methods:

(a) In the case of those compounds in which R represents a hydrogen atom, by the series of reactions schematically shown below:

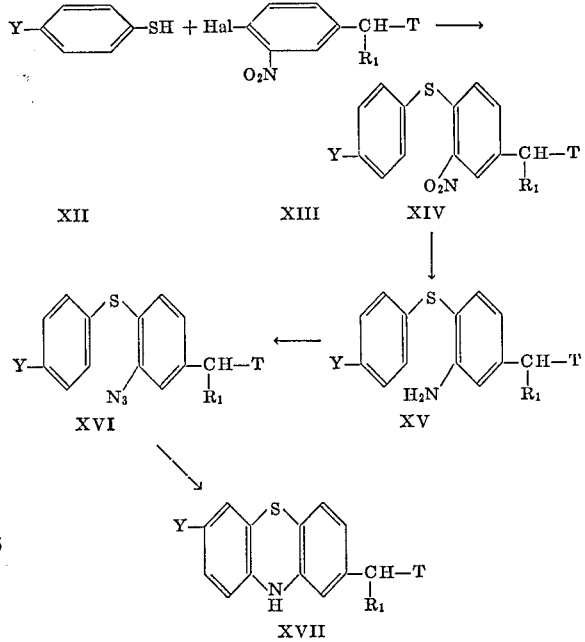

or by the following series of reactions:

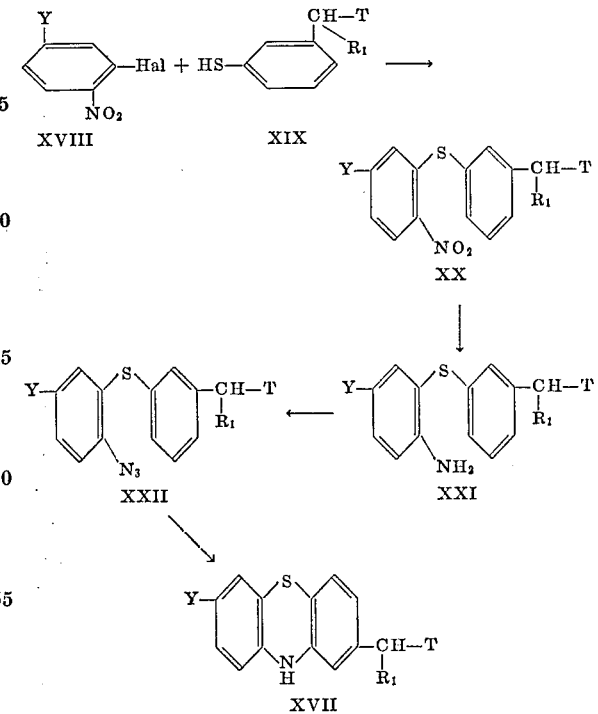

wherein Hal represents a halogen, preferably chlorine or bromine, atom, and Y, $R_1$ and T are as hereinbefore defined.

The amines of Formulae XV and XXI are prepared by reduction of the corresponding nitro derivatives of Formulae XIV and XX, respectively, by methods known per se, for example by catalytic reduction in the presence of palladium, or by hydrogenation using chemical reagents such as iron and acetic acid.

The azides of Formulae XVI and XXII are prepared by transformation of amines of Formulae XV and XXI, respectively, into their corresponding diazonium salts by methods known per se, followed by the action of sodium azide on the salts in water at a temperature of about 0° C.

The phenthiazine derivatives of Formula XVII are prepared by cyclisation of azides of Formulae XVI and XXII in a saturated hydrocarbon of high boiling point, such as Decalin, at a temperature between 100° and 200° C.

(b) In the case of those compounds of Formula XI in which R represents a methyl group, by reacting a reactive ester of formula Z—$CH_3$ (Z being as hereinbefore defined) with a phenthiazine derivative of Formula XVII. The reaction is preferably effected by heating the reactants in an organic solvent such as a lower alkanol using a phenthiazine of Formula XVII wherein T represents an alkoxycarbonyl group.

The phenthiazine starting materials of Formula XVII can be obtained, in addition to the methods heretofore described, by the method described by S. P. Massie et coll., J. Org. Chem., 21, 1006 (1956) for the preparation of methyl (3-phenthiazinyl)acetate.

(c) In the case of those compounds of Formula XI in which R represents a methyl group, $R_1$ represents a hydrogen atom and T represents a cyano group, by the following series of reactions:

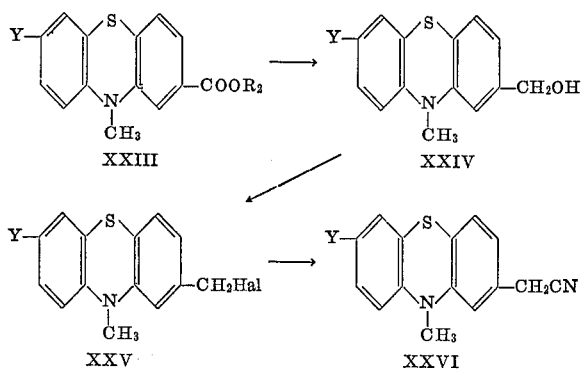

wherein Y, $R_2$ and Hal are as hereinbefore defined.

The alcohols of Formula XXIV are prepared from the esters of Formula XXIII by methods known per se for the conversion of esters to alcohols, in particular by means of lithium aluminium hydride.

The halogenomethyl compounds of Formula XXV are prepared from the alcohols of Formula XXIV, for example, by the action of a phosphorus halide.

The nitriles of Formula XXVI are prepared by the action of a metallic cyanide, in particular sodium cyanide, on the halogenomethyl compounds of Formula XXV.

The esters of Formula XXIII can be obtained, for example, by the method described by G. Cauquil and A. Casadevall, Bull. Soc. Chim., p. 768 (1955) for the preparation of 3-methoxycarbonyl-10-methylphenthiazine.

The new phenthiazine derivatives of general Formula I can be converted into metal salts or addition salts with nitrogenous bases by application of methods known per se. Thus, these salts can be obtained by the action of an alkali metal (for example, sodium, potassium or lithium) or alkaline earth metal base, ammonia or an amine, on a phenthiazine of Formula I in an appropriate solvent such as alcohol, an ether, a ketone, or water; the salt formed is precipitated, if necessary after concentration of the solution, and is separated by filtration or decantation.

In this specification and accompanying claims the term "methods known per se" means methods heretofore used or described in the chemical literature.

For therapeutic purposes the phenthiazine derivatives of Formula I are employed as such or in the form of pharmaceutically-acceptable salts, i.e. salts which are relatively innocuous to the animal organism in therapeutic doses of the salts, such as alkali metal, alkaline earth metal, ammonium and amine salts.

The following examples, in which the temperatures stated are in degrees centigrade and the positions on the phenthiazine ring are in accordance with the Beilstein nomenclature, illustrate the invention.

EXAMPLE I

A mixture of 3-acetyl-10-methylphenthiazine (43.9 g.), sulphur (8.8 g.) and morpholine (100 cc.) is heated under reflux for 16 hours. The reation mixture is then poured into ethanol (750 cc.). The crystals produced are separated by filtration and washed with ethanol (100 cc.) and then with petroleum ether (200 cc.). There is thus obtained (10 - methyl-3-phenthiazinyl)acetothiomorpholide (52.5 g.) melting at 185°–187°.

A mixture of (10-methyl-3-phenthiazinyl)acetothiomorpholide (52.5 g.), 85% potassium hydroxide (88 g.) and ethanol (750 cc.) is heated under reflux for 16 hours. The reaction mixture is concentrated to dryness under a pressure of 20 mm. Hg and the residue taken up in water (1 litre). The solution obtained is treated with decolorising charcoal (10 g.), filtered, and the filtrate acidified with hydrochloric acid (d.=1.19; 120 cc.). A product is precipitated and the crystals separated by filtration and washed with water (750 cc.). There is thus obtained a product (36 g.) melting at 140°. On recrystallisation from benzene (100 cc.) a product (25.5 g.), melting at 145°, is obtained. After recrystallisation from benzene (120 cc.), (10-methyl-3-phenthiazinyl)acetic acid (21.4 g.), melting at 146°, is finally obtained.

The 3-acetyl-10-methylphenthiazine used as starting material is prepared according to G. Cauquil and A. Casadevall, Bull. Soc. Chim., p. 768 (1955).

EXAMPLE II

A mixture of 3-acetyl-7-methoxy-10-methylphenthiazine (28.5 g.), sulphur (5.12 g.) and morpholine (60 cc.) is heated under reflux for 16½ hours. The reaction mixture is then poured into ethanol (450 cc.). The crystals produced are separated by filtration and washed with ethanol (45 cc.) and then with petroleum ether (100 cc.) to give (7-methoxy-10-methyl-3-phenthiazinyl)acetothiomorpholide (34 g.) melting at 142°.

A mixture of (7-methoxy-10-methyl-3-phenthiazinyl) acetothiomorpholide (34 g.), 85% potassium hydroxide (52.2 g.) and ethanol (500 cc.) is heated under reflux for 14½ hours. The reaction mixture is then concentrated to dryness under reduced pressure (20 mm. Hg) and the crystalline residue thus obtained dissolved in water (400 cc.) and then treated with decolorising charcoal (20 g.) and filtered. The filtrate is acidified with 4 N hydrochloric acid (300 cc.). The crystals formed are separated by filtration and then washed with water (250 cc.) to give a product (23.9 g.) melting at 152°–153°, which is then recrystallised from benzene (239 cc.). There is thus obtained a product (15 g.) melting at 158°. On recrystallisation from benzene (150 cc.), (7-methoxy-10-methyl-3-phenthiazinyl)acetic acid (12.9 g.), melting at 160°–161°, is finally obtained.

The 3-acetyl - 7 - methoxy-10-methylphenthiazine employed as starting material is prepared by heating a mixture of 3-acetyl-7-methoxyphenthiazine (138.5 g.), methyl iodide (277 cc.) and methanol (692.5 cc.) in a sealed tube at 100° for 24 hours. The reaction mixture is concentrated to dryness under a pressure of 20 mm. Hg, and the crystalline residue obtained is taken up in methylene chloride (700 cc.) and then in ethyl acetate (900 cc.). The two organic solutions obtained are washed separately with water (500 cc.), then with an aqueous solution of sodium hyposulphite (200 g./litre; 500 cc.) and finally with water (250 cc.). The two solutions are then dried separately over anhydrous sodium sulphate and treated with decolorising charcoal (15 g.). The solutions are combined and then concentrated under reduced pressure (20 mm. Hg) to give 3-acetyl-7-methoxy-10-methylphenthiazine (146 g.) melting at 125°.

3-acetyl-7-methoxyphenthiazine is obtained by heating a mixture of 2-amino-4-acetyl-2′-bromo-5′-methoxy-diphenylsulphide (158 g.), potassium carbonate (68 g.), copper powder (5.68 g.) and dimethylformamide (1200 cc.) under reflux for 22 hours. The solution obtained is filtered and chromatographed over alumina (1200 g.). Elution is effected with dimethylformamide and there is recovered a fraction of 2720 cc. volume. This fraction is evaporated to dryness under reduced pressure (20 mm. Hg) and the crystalline residue is taken up in chloroform (90 cc.). The crystals are separated by filtration and washed wtih chloroform (100 cc.) and then with hexane (200 cc.) to give 3-acetyl-7-methoxyphenthiazine (100.6 g.) melting at 198°.

2-amino-4-acetyl-2'-bromo-5'-methoxy-diphenylsulphide is prepared by introducing iron (223 g.) in small portions into a mixture of 2-nitro-4-acetyl-2'-bromo-5'-methoxy-diphenylsulphide (320 g.), acetic acid (2800 cc.) and water (280 cc.) heated under reflux. Reflux is then continued for 2 hours 15 minutes and the reaction mixture then concentrated to dryness under reduced pressure (20 mm. Hg). The residue obtained is taken up in methylene chloride (1 litre) and water (3 litres). The mixture is then filtered with the aid of a filtration adjuvant and washed with methylene chloride (500 cc.) and water (500 cc.). The organic solutions are combined, washed with water (1 litre) and treated wtih decolorising charcoal (30 g.) and then dried over anhydrous sodium sulphate. After filtration and concentration to dryness under reduced pressure (20 mm. Hg), an oil (283.5 g.) is obtained which is taken up in diisopropyl ether (1100 cc.). The crystals produced are separated by filtration and washed with ethanol (100 cc.) to give 2-amino-4-acetyl-2'-bromo-5'-methoxy-diphenylsulphide (226.3 g.) melting at 85°.

2-nitro - 4 - acetyl - 2' - bromo-5'-methoxy-diphenylsulphide is prepared by pouring a solution of 85% potassium hydroxide (79.2 g.) in ethanol 370 cc.) at 60° into a solution of crude 2-bromo-5-methoxythiophenol (262 g.) in isopropanol (2390 cc.). 3-nitro-4-chloroacetophenone (239 g.) is then added to this reaction mixture and the mixture heated under reflux for 3 hours. The crystalline product is separated by filtration and washed with isopropanol (500 cc.). The product obtained is dissolved in methylene chloride (2 litres), washed with water (1 litre), treated with decolorising charcoal (30 g.) and dried over anhydrous sodium sulphate. After filtration and concentration to dryness under a pressure of 20 mm. Hg, there is obtained a product (380 g.) melting at 130°, which is recrystallised from acetonitrile (1600 cc.). The crystals are separated by filtration, washed with acetonitrile (250 cc.) and then with petroleum ether (750 cc.) to yield 2-nitro-4-acetyl-2'-bromo-5'-methoxy-diphenylsulphide (320 g.) melting at 135°.

3-nitro-4-chloroacetophenone can be prepared according to J. R. Keneford, J. Chem. Soc., p. 227 (1947).

2-bromo-5-methoxythiophenol is obtained by pouring a solution of sodium nitrite (103.5 g.) in water (350 cc.) into a mixture of 3-amino-4-bromoanisole hydrochloride (357.7 g.), water (1 litre) and hydrochloric acid (d.=1.19; 150 cc.) over a period of 40 minutes while maintaining the temperature at 0°. The diazonium salt solution obtained is poured over a period of 85 minutes into a mixture of potassium ethylxanthate (307 g.), water (600 cc.) and ethyl aetate (2 litres) while maintaining the temperature at about 50°. After decantation, the mixture is extracted again with ethyl acetate (600 cc.), and the organic solutions combined, washed with 4 N sodium hydroxide solution (250 cc.), water (1600 cc.), treated with decolorising charcoal (20 g.), dried over anhydrous sodium sulphate, filtered and concentrated to dryness under reduced pressure (20 mm. Hg). A reddish-brown oil (415 g.) is obtained. This oil is dissolved in ethanol (2250 cc.), and the solution is poured into a solution of potassium hydroxide (332 g.) in water (780 cc.), and the mixture heated under reflux for 10 hours. The mixture is then concentrated to dryness under reduced pressure (20 mm. Hg), the residue taken up in water (2 litres), and the solution obtained filtered in the presence of a filtration adjuvant and washed with water (300 cc.). The filtrate is acidified with hydrochloric acid (d.=1.19; 460 cc.) and the oil-formed is extracted with methylene chloride (1300 cc.). The extract is washed with water (100 cc.), dried over anhydrous sodium sulphate and then filtered and concentrated to dryness under a pressure of 20 mm. Hg. There is thus obtained 2-bromo-5-methoxythiophenol (262 g.) which in its crude oily state is employed for the condensation with 3-nitro-4-chloroacetophenone.

3-amino-4-bromoanisole can be prepared according to H. H. Hodgson, J. Chem. Soc., p. 946 (1935).

EXAMPLE III

A mixture of 3-acetyl-7,10-dimethylphenthiazine (12.9 g.), sulphur (2.5 g.) and morpholine (30 cc.) is heated under reflux for 16 hours. The reaction mixture is then treated with water (200 cc.) and the amorphous solid obtained is washed with water (250 cc.). The solid is dissolved in methylene chloride (150 cc.) and the solution obtained washed with water (50 cc.), then with 4 N hydrochloric acid (100 cc.) and finally with water (250 cc.), treated with decolorising charcoal (2 g.), filtered and dried over anhydrous sodium sulphate. After filtration and concentration to dryness under reduced pressure (20 mm. Hg), there is obtained a meringue (18.9 g.) which is taken up in ethanol (150 cc.). The crystals formed are separated by filtration and washed with ethanol (15 cc.) to give (7,10-dimethyl-3-phenthiazinyl) acetothiomorpholide (15 g.) melting at 120°.

A mixture of (7,10-dimethyl-3-phenthiazinyl)acetothiomorpholide (15 g.), 85% potassium hydroxide (24 g.) and ethanol (250 cc.) is heated under reflux for 17 hours. The reaction mixture is then concentrated under reduced pressure (20 mm. Hg) and the residue taken up in water (150 cc.). The solution obtained is treated with decolorising charcoal (1 g.), filtered and the filtrate acidified with 6 N hydrochloric acid (80 cc.). The crystals formed are separated by filtration and washed with water (300 cc.) to give a product (9.8 g.) melting at 134°, which is recrystallised from a mixture of benzene (50 cc.) and cyclohexane (100 cc.) to yield a product (5.2 g.) melting at 134–136°. After recrystallisation from a benzene-cyclohexane mixture (1/1; 31.5 cc.), there is finally obtained (7,10-dimethyl-3-phenthiazinyl)acetic acid (4.1 g.) melting at 137°.

The 3-acetyl-7,10-dimethylphenthiazine employed as starting material is prepared by heating a mixture of 3-acetyl-7-methylphenthiazine (14 g.), methyl iodide (28 cc.) and methanol (70 cc.) at 100° for 15½ hours. The reaction mixture is concentrated to dryness under a pressure of 20 mm. Hg and the solid obtained is dissolved in methylene chloride (110 cc.). The solution obtained is washed with water (150 cc.), then with 0.1 N sodium hyposulphite (100 cc.) and finally with water (150 cc.), treated with decolorising charcoal (2 g.), filtered and dried over anhydrous sodium sulphate. After filtration and concentration to dryness under reduced pressure (20 mm. Hg), there is obtained 3-acetyl-7,10-dimethylphenthiazine (12.9 g.) melting at 134°.

3-acetyl-7-methylphenthiazine is prepared by heating a mixture of 2-amino-4-acetyl-2'-bromo-5'-methyl-diphenylsulphide (32 g.), potassium carbonate (14.5 g.), copper powder (1.2 g.) and dimethylformamide (280 cc.) for 22 hours. The reaction mixture is then treated with decolorising charcoal (5 g.), filtered, and concentrated to dryness under reduced pressure (20 mm. Hg). The crystalline residue is taken up in water (100 cc.) and the crystals separated by filtration to yield a product (36 g.) melting at 180°. This product is dissolved in dimethylformamide (100 cc.) and the solution obtained chromatographed over alumina (350 g.). After elution with dimethylformamide, there is recovered a fraction 1 litre in volume. This fraction is evaporated to dryness under reduced pressure (20 mm. Hg) and the crystalline residue is taken up in ethanol (50 cc.). The crystals are separated by filtration and washed with ethanol (30 cc.) and then with hexane (75 cc.). There is thus obtained 3-acetyl-7-methylphenthiazine (14 g.) melting at 189°.

2-amino - 4 - acetyl - 2' - bromo - 5' - methyl-diphenylsulphide is prepared by introducing iron (30.8 g.) in small portions into a reaction mixture of 2-nitro-4-acetyl-2'-bromo-5'-methyl-diphenylsulphide (40.5 g.), acetic acid (350 cc.) and water (35 cc.) heated under reflux. Heating under reflux is continued for 2 hours and then the reaction mixture is concentrated to dryness under a pressure of 20 mm. Hg. The residue is taken up in water (500 cc.) and methylene chloride (200 cc.). The solution obtained is filtered in the presence of a filtration adjuvant, and washed with methylene chloride (150 cc.). The organic solutions are combined, washed with water (100 cc.), dried over anhydrous sodium sulphate, filtered and concentrated to dryness under reduced pressure (20 mm. Hg). There is thus obtained 2-amino-4-acetyl - 2' - bromo-5'-methyl-diphenylsulphide (32 g.) melting at 146°.

2-nitro - 4 - acetyl - 2' - bromo - 5' - methyl-diphenylsulphide is prepared by pouring a solution of 85% potassium hydroxide (9.9 g.) in ethanol (50 cc.) at 60° into a mixture of 2-bromo-5-methyl-thiophenol (30.5 g.), 3-nitro-4-chloro-acetophenone (30 g.) and isopropanol (300 cc.). The reaction mixture is heated under reflux for 3 hours, and then concentrated to dryness under a pressure of 20 mm. Hg. The residue obtained is taken up in methylene chloride (450 cc.) and water (200 cc.), and, after decantation, the organic solution is washed with water (200 cc.), treated with decolorising charcoal (5 g.), filtered and dried over anhydrous sodium sulphate. After filtration and concentration to dryness under reduced pressure (20 mm. Hg), an oily product (52.7 g.) is obtained. This product is dissolved in methylene chloride (500 cc.) and chromatographed over alumina (520 g.). After elution with methylene chloride there is recovered a fraction 1 litre in volume. This fraction is concentrated to dryness under a pressure of 20 mm. Hg and yields a thick oil (46.4 g.). This oil is taken up in ethanol (200 cc.) and a product crystallises. The crystals are separated by filtration and washed with ethanol (20 cc.) and then hexane (20 cc.). There is thus obtained 2-nitro-4-acetyl-2'-bromo-5'-methyl-diphenylsulphide (40.5 g.) melting at 99°.

3-nitro-4-chloro-acetophenone can be prepared according to J. R. Keneford, J. Chem. Soc., p. 227 (1947).

2-bromo-5-methyl-thiophenol can be prepared according to K. N. Dixit et coll. Monatsch. Chem., 94, 414–18 (1963).

EXAMPLE IV

A mixture of 7-chloro-3-acetylphenthiazine (49 g.), flowers of sulphur (9.3 g.) and morpholine (75 cc.) is heated under reflux for 16 hours. The major proportion of the morpholine is then distilled off under a pressure of 20 mm. Hg, and ethanol (200 cc.) is added to the residue. A solid crystallises which is separated by filtration, washed with ethanol (50 cc.) and diethyl ether (200 cc.), and dried to give (7-chloro-3-phenthiazinyl)acetothiomorpholide (50 g.) melting at 164°.

A mixture of (7-chloro-3-phenthiazinyl)acetothiomorpholide (50 g.), 85% potassium hydroxide (76 g.) and ethanol (600 cc.) is heated under reflux for 16 hours. After distillation of the major proportion of the solvent under a pressure of 20 mm. Hg, water (500 cc.) is added and the mixture then acidified with hydrochloric acid (d.=1.19; 150 cc.). The acidified mixture is left for 3 hours, and the precipitated solid is separated by filtration, washed with distilled water (750 cc.) and dried. There is thus obtained a solid (40 g.) melting at about 250° which, after recrystallisation twice from acetic acid (770 cc. and 540 cc. respectively), yields (7-chloro-3-phenthiazinyl)-acetic acid (22.8 g.) melting at 250°. A final recrystallisation from n-butyl acetate (700 cc.) gives (7-chloro-3-phenthiazinyl)acetic acid (13 g.) melting at 255°.

The 7-chloro-3-acetylphenthiazine used as starting material is prepared by reacting 5 N hydrochloric acid (190 cc.) with 7-chloro-3,10-diacetylphenthiazine (62 g.) in ethanol (750 cc.) under reflux for 3 hours. The product which crystallises is separated by filtration and washed with ethanol (20 cc.), diethyl ether (60 cc.) and petroleum ether (100 cc.), and dried. There is thus obtained 7-chloro-3-acetylphenthiazine (49.5 g.) melting at 228–229°.

7-chloro-3,10-diacetylphenthiazine is obtained by reacting acetyl chloride (28.6 g.) with 2-chloro-10-acetylphenthiazine (104 g.) in carbon disulphide (630 cc.) in the presence of anhydrous aluminium chloride (136 g.). After maintaining the reaction mixture for 15 hours at 50°, the carbon disulphide is decanted and the still fluid residue is poured into a mixture of 6 N hydrochloric acid (250 cc.) and ice (2.5 kg.). A solid separates. Filtration and drying gives a crude product (185 g.), which after recrystallisation from ethanol (1390 cc.) yields 7-chloro-3,10-diacetylphenthiazine (62.9 g.) melting at 146–148°.

2-chloro-10-acetylphenthiazine can be prepared by the method described by H. L. Yale, J. Amer. Chem. Soc. 77, 2270 (1955).

EXAMPLE V

A mixture of 3-acetyl-7-methoxyphenthiazine (16.26 g.), sulphur (3.072 g.) and morpholine (36 cc.) is heated under reflux for 16 hours. The reaction mixture is then poured into ethanol (200 cc.). The crystals produced are separated by filtration and washed with ethanol (20 cc.) and hexane (50 cc.) to give (7-methoxy-3-phenthiazinyl)-acetothiomorpholide (14.4 g.) melting at 132°.

A mixture of (7-methoxy-3-phenthiazinyl)acetothiomorpholide (14.4 g.), 85% potassium hydroxide (23 g.) and ethanol (200 cc.) is heated under reflux for 21 hours. The crystalline product formed is separated by filtration, washed with ethanol (10 cc.) and diethyl ether (30 cc.) to give a product (13.2 g.), the melting point of which is greater than 300°. This product is dissolved in water (100 cc.), acidified with N hydrochloric acid (50 cc.) and the crystalline product formed is extracted with ethyl acetate (1200 cc.). After decantation, the organic solution is washed with water (200 cc.), dried over anhydrous sodium sulphate and concentrated to dryness under reduced pressure (20 mm. Hg). There is thus obtained a product (10 g.) melting at 238°. One recrystallisation of this product (12.6 g.) from butanol (210 cc.) gives a product (9.7 g.) melting at 238°–240°, which is then recrystallised from butyl acetate (300 cc.) to give (7-methoxy-3-phenthiazinyl)acetic acid (7.55 g.) melting at 238–240°.

3-acetyl-7-methoxyphenthiazine can be prepared as described in Example II.

EXAMPLE VI

Methyl ethyl methyl(3-phenthiazinyl)malonate (18.5 g.) is dissolved in ethanol (200 cc.) and the solution obtained is heated under reflux. N sodium hydroxide solution (134 cc.) is then introduced slowly, over a period of 1½ hours, and heating under reflux is continued for about another 2 hours. The alcohol is distilled off under a pressure of 20 mm. Hg, and the residue obtained is diluted with water (100 cc.). 4 N hydrochloric acid (45 cc.) is added and a product precipitates. This produce is extracted with ethyl acetate (800 cc.) and the organic solution is dried over anhydrous sodium sulphate and evaporated. There is thus obtained a crystalline residue (11.8 g.) melting at about 240°. This residue is triturated in the cold with ethyl acetate (30 cc.). The crystals formed are separated by filtration and washed with ethyl acetate (10 cc.). There is thus obtained a product (10.7 g.) which, after recrystallisation from ethanol (320 cc.), gives 2-(3-phenthiazinyl)propionic acid (6.95 g.) melting at 240°.

The methyl ethyl methyl(3-phenthiazinyl)malonate employed as starting material is prepared in the following manner:

Methyl ethyl (3-phenthiazinyl)malonate (27.5 g.) and a solution of methyl iodide (13.6 g.) in anhydrous ethanol (40 cc.) is added to a solution of sodium (2.2 g.) in anhydrous ethanol (220 cc.). The reaction mixture is heated at 55° for about 1 hour, then the ethanol is evaporated under a pressure of 20 mm. Hg and the residue taken up with diethyl ether (350 cc.) and water (250 cc.). The organic phase is decanted and washed with water (300 cc.). The organic solution is treated with decolorising charcoal (3 g.), filtered and dried over anhydrous sodium sulphate. After evaporation of the diethyl ether, the residue (27 g.) is dissolved in diisopropyl ether (40 cc.). Crystallisation is initiated by scratching the walls of the vessel and the solution left overnight in a refrigerator. The crystals formed are filtered off and washed with diisopropyl ether (20 cc.) and then with petroleum ether (25 cc.). There is thus obtained a product (14.7 g.) which, after recrystallisation from diisopropyl ether (40 cc.), yields methyl ethyl methyl(3-phenthiazinyl)malonate (11.3 g.) melting at 95–96°.

Methyl ethyl (3-phenthiazinyl)malonate is prepared by reacting methyl (3-phenthiazinyl)acetate (30 g.) with ethyl carbonate (87 g.) in anhydrous ethanol (60 cc.) in the presence of sodium (2.7 g.). The mixture is heated at about 121–124° for about 1½ hours while the alcohol formed is slowly distilled off. The reaction mixture is left to cool and N hydrochloric acid (117 cc.) is then added. The product crystallises and is separated by filtration and recrystallised from ethanol (230 cc.) to yield methyl ethyl (3-phenthiazinyl)malonate (18.6 g.) melting at 125°.

Methyl ethyl (3-phenthiazinyl)malonate can also be obtained by the decarboxylation of ethyl 3-(3-phenthiazinyl)-3-methoxycarbonyl-2-oxopropionate (79 g.) by heating at about 180° under a pressure of 0.4 mm. Hg. The residue obtained is purified by filtering a solution of it in benzene (200 cc.) through a column of alumina (1200 g.). After elution with benzene (11 litres) and evaporation of the solvent, there is obtained a paste which is crystallised from ethanol (80 cc.). The crystals are filtered off to yield methyl ethyl (3-phenthiazinyl)malonate (15 g.) melting at about 120°.

Ethyl 3-(3-phenthiazinyl) - 3 - methoxycarbonyl-2-oxopropionate is obtained by reacting methyl (3-phenthiazinyl)acetate (54.2 g.) with ethyl oxalate (29.2 g.) in anhydrous ethanol (100 cc.) in the presence of sodium (4.6 g.). The reaction mixture is left overnight at ambient temperature and then the alcohol is evaporated off under a pressure of 20 mm. Hg and the residue taken up in N hydrochloric acid (200 cc.) and diethyl ether (350 cc.). The organic phase is separated and washed with water (450 cc.). The ethereal solution is dried over anhydrous sodium sulphate and the solvent evaporated to yield ethyl 3-(3-phenthiazinyl) - 3 - methoxycarbonyl-2-oxopropionate (79 g.) in the form of an oil.

Methyl (3-phenthiazinyl)acetate is prepared according to S. P. Massie, I. Cooke and W. A. Hills, J. Org. Chem., 21, 1006 (1956).

EXAMPLE VII

Methyl ethyl methyl(10-methyl-3-phenthiazinyl)malonate (25.6 g.) is dissolved in ethanol (300 cc.) and the solution obtained is heated under reflux. N sodium hydroxide solution (138 cc.) is added slowly, over a period of 3 hours, and heating under reflux is continued for a further 2 hours. After cooling, the insoluble material (4.3 g.) is separated by filtration. The filtrate is evaporated under a pressure of 20 mm. Hg, and the residue diluted with N hydrochloric acid (68 cc.). The product which precipitates is extracted with diethyl ether (230 cc.) and the organic phase is washed with water (200 cc.) and dried over anhydrous sodium sulphate. After evaporation of the diethyl ether, the residue (13.5 g.) is dissolved by heating in diisopropyl ether (50 cc.). After cooling, the product which crystallises is filtered off and washed with petroleum ether (2×20 cc.). From the resulting product (9 g.) melting at 140° there is obtained, after recrystallisation from acetonitrile (36 cc.), 2,10-methyl-3-phenthiazinyl)propionic acid (8.1 g.) melting at 144°.

Methyl ethyl methyl(10-methyl-3-phenthiazinyl)malonate is prepared in the following way:

Methyl ethyl (10-methyl-3-phenthiazinyl)malonate (27 g.) followed by a solution of methyl iodide (12.9 g.) in anhydrous ethanol (40 cc.) is added to a solution of sodium (2.09 g.) in anhydrous ethanol (220 cc.). The reaction mixture is heated at 50° for 4 hours, and the ethanol then evaporated under a pressure of 20 mm. Hg. The residue is taken up in water (90 cc.) and methylene chloride (300 cc.), the organic solution decanted, washed with water (200 cc.) and dried over anhydrous sodium sulphate. After evaporation of the solvent, there is obtained an orange oil (26.2 g.) which is dissolved in benzene (250 cc.), and the solution filtered through a column of alumina (260 g.). After elution with benzene (1 litre), the solvent is evaporated to give methyl ethyl methyl(10-methyl-3-phenthiazinyl)malonate (25.6 g.) as an oil.

Methyl ethyl (10-methyl-3-phenthiazinyl)malonate is obtained by reacting methyl (10-methyl-3-phenthiazinyl)acetate (25 g.) with ethyl carbonate (73 g.) in anhydrous ethanol (50 cc.) in the presence of sodium (2.05 g.). The reaction mixture is heated at about 105–115° while the alcohol formed is slowly distilled off. The mixture is left to cool and then N hydrochloric acid (90 cc.) is added followed by methylene chloride (400 cc.). The organic phase is decanted, washed with water (100 cc.) and dried over anhydrous sodium sulphate. After evaporation of the solvent, the crystalline residue obtained is triturated in the cold with petroleum ether (100 cc.). The crystals are separated by filtration and washed with hexane (2×50 cc.) to yield methyl ethyl (10-methyl-3-phenthiazinyl)malonate (27.2 g.) melting at 120°.

Methyl (10-methyl-3-phenthiazinyl)acetate is prepared by reacting methanol (10 g.) with (10-methyl-3-phenthiazinyl)acetic acid (27.1 g. in 1,2-dichloroethane (30 cc.) in the presence of methanesulphonic acid (1.5 cc.) with heating under reflux for 30 minutes. The reaction mixture is left to cool and methylene chloride (250 cc.) then added. The organic phase is decanted, washed with a saturated aqueous solution of sodium bicarbonate (100 cc.) and water (100 cc.) and then dried over anhydrous sodium sulphate. After evaporation of the solvent, a crystalline residue is obtained which is triturated in the cold with cyclohexane (50 cc.). The crystals are separated by filtration and washed with petroleum ether (50 cc.) to yield methyl (10-methyl-3-phenthiazinyl)acetate (25.6 g.) melting at 100–101°.

(10-methyl-3-phenthiazinyl)acetic acid can be obtained as indicated in Example I.

EXAMPLE VIII

Methyl ethyl ethyl(10-methyl - 3 - phenthiazinyl)malonate (30.3 g.) is dissolved in ethanol (340 cc.) and the solution is heated under reflux. N sodium hydroxide solution (157 cc.) is introduced slowly over a period of 4 hours, and the reaction mixture maintained under reflux for a further one hour. After cooling, the solvents are distilled off under a pressure of 20 mm. Hg and the residue treated with N hydrochloric acid (170 cc.) and then methylene chloride (250 cc.). The organic phase is decanted, washed with distilled water (210 cc.) and dried over anhydrous sodium sulphate. After evaporation of the solvent, the residue (28 g.) is triturated in the cold with diisopropyl ether (75 cc.). The solid which crystallises is separated by filtration and washed with dissopropyl ether (25 cc.). From the recovered product (19.8 g.) melting at 166° there is obtained, after recrystallisation from ethanol (67 cc.), 2-(10-methyl-3-phenthiazinyl)-butyric acid (9.7 g. melting at 174°.

The methyl ethyl ethyl(10-methyl-3-phenthiazinyl)-malonate is prepared in the following way:

Methyl ethyl (10-methyl - 3 - phenthiazinyl)malonate (35.7 g.) followed by a solution of ethyl iodide (18.7 g.) in anhydrous ethanol (30 cc.) is added to a solution of sodium (2.76 g.) in anhydrous ethanol (340 cc.). The reaction mixture is maintained at about 60° for five hours. After cooling, the small amount of insoluble matter is separated by filtration and the filtrate is evaporated under a pressure of 20 mm. Hg. The residue is diluted with distilled water (100 cc.) and methylene chloride (260 cc.). The organic phase is decanted, washed with distilled water (450 cc.) and dried over anhydrous sodium sulphate. Evaporation of the solvent yields an oily product (35.5 g.) which is dissolved in benzene (355 cc.), and the solution filtered over alumina (355 g.). After elution with benzene (1500 cc.) and evaporation of the solvent, there is obtained methyl ethyl ethyl(10-methyl-3-phenthiazinyl)malonate (30.3 g.) in the form of a clear light-yellow syrup.

EXAMPLE IX

N sodium hydroxide solution (296 cc.) is poured over a period of 3 hours into a solution of methyl ethyl methyl (7-methoxy-10-methyl - 3 - phenthiazinyl)malonate (59.7 g.) in ethanol (600 cc.) heated under reflux in an atmosphere of nitrogen. The reaction mixture is concentrated to dryness under reduced pressure (20 mm. Hg), the residue obtained acidified with N hydrochloric acid (300 cc.) and the gum formed extracted with methylene chloride (150 cc.). The organic solution is washed with water (200 cc.), treated with decolorising charcoal (10 g.), dried over anhydrous sodium sulphate and concentrated to dryness under reduced pressure (20 mm. Hg). The oil obtained (48 g.) is dissolved in N sodium hydroxide solution (200 cc.) and the aqueous solution washed with diethyl ether (300 cc.), treated with decolorising charcoal (5 g.) and acidified with N hydrochloric acid (200 cc.). The oil formed is dissolved in methylene chloride (350 cc.), the solution washed with water (100 cc.), treated with decolorising charcoal (5 g.) and dried over anhydrous sodium sulphate. The solution is concentrated to dryness under reduced pressure (20 mm. Hg) to give an oil (35.6 g.) which crystallises slowly. On recrystallisation from diisopropyl ether (180 cc.) a product (19.5 g.), melting at 123–124°, is obtained. Further recrystallization from diisopropyl ether (290 cc.) yields 2-(7-methoxy-10-methyl-3-phenthiazinyl)-propionic acid (12.9 g.) melting at 124–125°.

The methyl ethyl methyl(7-methoxy-10-methyl-3-phenthiazinyl)-malonate employed as starting material is prepared in the following way:

Methyl ethyl (7-methoxy-10-methyl-3-phenthiazinyl) malonate (62.2 g.) followed by methyl iodide (45.7 g.) is added to a solution of sodium (4.45 g.) in an hydrous ethanol (500 cc.). The reaction mixture is heated under reflux for 1 hour at 45°, then for 6 hours at 55°, and finally concentrated to dryness under reduced pressure (20 mm. Hg). The residue is taken up in methylene chloride (300 cc.) and water (250 cc.), filtered in the presence of a filtration adjuvant, washed with methylene chloride (150 cc.) and water (150 cc.), and decanted. The aqueous solution is extracted once again with methylene chloride (100 cc.), and the combined organic solutions washed with water (100 cc.), aqueous 0.1 N sodium hyposulphite solution (200 cc.) and finally with water (200 cc.). After drying over anhydrous sodium sulphate and evaporation to dryness under reduced pressure (20 mm. Hg), there is obtained an oil (64.8 g.) which is dissolved in methylene chloride (100 cc.) and chromatographed over alumina (650 g.). After elution with methylene chloride, a fraction of 2.5 litres is recovered and concentrated to dryness under reduced pressure (20 mm. Hg) to give methyl ethyl methyl(7-methoxy - 10 - methyl-3 - phenthiazinyl)malonate (59.7 g.) melting at 70–72°.

Methyl ethyl (2-methoxy-10-methyl-3-phenthiazinyl) malonate is prepared by reacting a solution of sodium (4.37 g.) in anhydrous ethanol (110 cc.) with a solution of methyl (7-methoxy-10-methyl-3-phenthiazinyl)acetate (59 g.) in ethyl carbonate (180 cc.). The reaction mixture is heated at about 105–110° for 3 hours and the ethanol formed is distilled off as it is formed. The reaction mixture is acidified with N hydrochloric acid (200 cc.) and the oil formed is extracted with methylene chloride (200 cc.). The methylene chloride solution is washed with water (210 cc.), treated with decolorising charcoal (5 g.), dried over anhydrous sodium sulphate and concentrated to dryness under reduced pressure (20 mm. Hg) giving an oil (77 g.) which is crystallised from methanol (300 cc.) to yield methyl ethyl (7-methoxy-10-methyl-3-phenthiazinyl) malonate (62.4 g.) melting at 80–82°.

Methyl (7-methoxy-10-methyl-3-phenthiazinyl)acetate is prepared by heating a mixture of (7-methoxy-10-methyl-3-phenthiazinyl)acetic acid (66.2 g.), methanol (26.5 cc.), 1,2-dichloroethane (66 cc.) and methanesulphonic acid (3.3 cc.) under reflux for 2 hours. The reaction mixture is taken up in methylene chloride (200 cc.), filtered in the presence of filtration adjuvant and decanted. The organic solution is washed with water (100 cc.), followed by a saturated aqueous solution of potassium carbonate (300 cc.) and finally with water (200 cc.), treated with decolorising charcoal (5 g.), dried over anhydrous sodium sulphate and filtered and diluted to a volume of 500 cc. The solution obtained is chromatographed over alumina (700 g.), eluted with methylene chloride and a fraction of 4 litres in volume recovered. Evaporation of this fraction to dryness under reduced pressure (20 mm. Hg) yields an oil (55.4 g.) which is crystallised from hexane (200 cc.) to give methyl (7-methoxy-10-methyl-3-phenthiazinyl)acetate (49.6 g.) melting at 99–100°.

(7 - methoxy-10-methyl - 3 - phenthiazinyl)acetic acid, M.P. 160–161°, can be prepared as indicated in Example II.

EXAMPLE X

A mixture of methyl (10-methyl-3-phenthiazinyl)acetate (4.7 g.), ethanol (50 cc.) and N sodium hydroxide solution (20 cc.) is heated under reflux for 2 hours. The alcohol formed is evaporated under reduced pressure (20 mm. Hg) and the residue diluted with water (50 cc.). N hydrochloric acid (25 cc.) is added. The product precipitated is extracted with methylene chloride (200 cc.) and the organic solution dried over anhydrous sodium sulphate and evaporated. The crystalline residue obtained (4.5 g.), melting at about 128°, is recrystallised from benzene (12 cc.) to yield (10-methyl-3-phenthiazinyl)acetic acid (2.5 g.) melting at 138°.

The methyl (10-methyl-3-phenthiazinyl)acetate employed as starting material is prepared by reacting methyl iodide (11.3 g.) with methyl (3-phenthiazinyl)acetate (5.4 g.) in anhydrous methanol (25 cc.) in a sealed tube at 125° for 23 hours. The reaction mixture is then diluted with methylene chloride (50 cc.). The organic solution is washed with N sodium hydrosulphite solution (20 cc.), a saturated sodium bicarbonate solution (6 cc.) and water (20 cc.), dried over anhydrous sodium sulphate and evaporated to give methyl (10-methyl-3-phenthiazinyl)acetate (4.7 g.).

Methyl (3-phenthiazinyl)acetate is prepared according to S. P. Massie et coll., J. Org. Chem., 21, 1006 (1956).

EXAMPLE XI

A mixture of (10-methyl-3-phenthiazinyl)acetonitrile (8 g.), 85% potassium hydroxide (8.9 g.), water (1 cc.) and ethanol (60 cc.) is heated under reflux for 7 hours. After cooling and dilution with water (100 cc.), the solution obtained is treated with decolorising charcoal (0.8 g.), filtered and the filtrate acidified with 4 N hydrochloric acid (37 cc.). The crystals produced are separated by filtration, washed with water (40 cc.) and dried to give (10-methyl-3-phenthiazinyl)acetic acid (8.5 g.) melting at 143°.

The (10-methyl-3-phenthiazinyl)acetonitrile employed as starting material is prepared by reacting sodium cyanide with 3 - bromomethyl-10-methylphenthiazine in aqueous acetone.

3-bromomethyl-10-methyl-phenthiazine can be prepared by the action of phosphorus tribromide on 3-hydroxymethyl-10-methylphenthiazine in the presence of pyridine in anhydrous diethyl ether.

3 - hydroxymethyl-10-methylphenthiazine can be prepared in the following manner:

A solution of 3 - methoxycarbonyl - 10 - methylphenthiazine (20.4 g.) in anhydrous diethyl ether (1 litre) is added to a suspension of lithium aluminium hydride (3.4 g.) in anhydrous diethyl ether (400 cc.). The reaction mixture is then heated under reflux for 3 hours, after which it is left to cool and water (48 cc.) and 2 N sodium hydroxide solution (20 cc.) are added. The organic phase is decanted and dried over anhydrous sodium sulphate. After evaporation of the ether, the residue obtained is dissolved with heating in a benzene-cyclohexane mixture (1/1; 100 cc.). Crystallisation is initiated by scratching the walls of the vessel and the reaction mixture is left to cool slowly. The crystals formed are separated by filtration giving a product (13.6 g.) melting at 77°. Recrystallisation from a mixture of benzene-cyclohexane (1/1; 97 cc.) yields 3-hydroxymethyl-10-methylphenthiazine (11.7 g.) melting at 78–79°.

10-methyl-3-methoxycarbonyl-phenthiazine can be prepared according to the method described by G. Cauquil and A. Casadevall, Bull. Soc. Chim., p. 768 (1955).

The present invention includes within its scope pharmaceutical compositions containing, as active ingredient, at least one of the phenthiazine derivatives of Formula I, or pharmaceutically-acceptable salt thereof, in association with a pharmaceutical carrier or coating. The invention includes especially such preparations made up for oral, parenteral or rectal administration, or topical application, e.g. as ointments or creams.

Solid compositions for oral administration include tablets, pills, powders, and granules. In such solid compositions the active compound is admixed with at least one inert diluent such as sucrose, lactose or starch. The compositions may also comprise, as is normal practice, additional substances other than inert diluents, e.g. lubricating agents, such as magnesium stearate. Liquid compositions for oral administration include pharmaceutically-acceptable emulsions, solutions, suspensions, syrups and elixirs containing inert diluents commonly used in the art, such as water and liquid paraffin. Besides inert diluents such compositions may also comprise adjuvants, such as wetting, emulsifying and suspending agents, and sweetening, flavouring and aromatizing agents. The compositions according to the invention, for oral administration, also include capsules of absorbable material such as gelatin containing the active substance with or without the addition of diluents or excipients.

Preparations according to the invention for parenteral administration include sterile aqueous or non-aqueous solutions, suspensions, or emulsions. Examples of non-aqueous solvents or vehicles are propylene glycol, polyethylene glycol, vegetable oils, such as olive oil, and injectable organic esters such as ethyl oleate. These compositions may also contain adjuvants such as preserving, wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

Compositions for rectal administration are suppositories which may contain, in addition to the active substance, excipients such as cacao butter or a suitable wax base.

The percentage of active ingredient in the compositions of the invention may be varied, it being necessary that it should constitute a proportion such that a suitable dosage shall be obtained. The dosage depends on the desired therapeutic effect, on the route of administration and on the duration of the treatment. The dosages are generally between 10 and 100 mg. per kilogramme of animal weight.

The following examples illustrate pharmaceutical compositions according to the invention.

EXAMPLE XII

Tablets weighing 500 mg. and having the following composition are prepared:

|  | Mg. |
|---|---|
| (10-methyl-3-phenthiazinyl)acetic acid | 250 |
| Starch | 190 |
| Colloidal silica | 50 |
| Magnesium stearate | 10 |

EXAMPLE XIII

Tablets weighing 200 mg. and having the following composition are prepared:

|  | Mg. |
|---|---|
| (10-methyl-3-phenthiazinyl)acetic acid | 50 |
| Starch | 120 |
| Colloidal silica | 27 |
| Magnesium stearate | 3 |

EXAMPLE XIV

Tablets analogous to those of Example XII may be prepared by replacing the (10-methyl-3-phenthiazinyl)-acetic acid by the same weight of (7-methoxy-10-methyl-3-phenthiazinyl)acetic acid.

EXAMPLE XV

Tablets weighing 500 mg. and having the following composition are prepared:

|  | Mg. |
|---|---|
| 2 - (7-methoxy-10-methyl-3-phenthiazinyl)propionic acid | 250 |
| Starch | 190 |
| Colloidal silica | 50 |
| Magnesium stearate | 10 |

EXAMPLE XVI

Tablets weighing 200 mg. and having the following composition are prepared:

|  | Mg. |
|---|---|
| 2 - (7-methoxy-10-methyl-3-phenthiazinyl)propionic acid | 50 |
| Starch | 120 |
| Colloidal silica | 27 |
| Magnesium stearate | 3 |

EXAMPLE XVII

Tablets analogous to those of Example XV may be prepared by replacing the 2-(7-methoxy-10-methyl-3-phenthiazinyl)propionic acid by the same weight of 2-(10-methyl-3-phenthiazinyl)propionic acid.

We claim:

1. A phenthiazine selected from the group consisting of a compound of the formula:

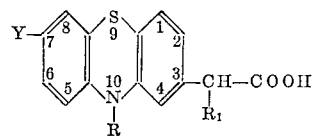

wherein R is a member selected from the group consisting of hydrogen and methyl, $R_1$ is a member selected from the group consisting of hydrogen, methyl and ethyl, and Y is a member selected from the group consisting of hydrogen, chlorine, methyl, and methoxy and R is methyl when $R_1$ and Y are both hydrogen, and a pharmaceutically-acceptable alkali metal, alkaline earth metal, ammonium and amine salt thereof.

2. A phenthiazine according to claim 1 wherein $R_1$ is a member selected from the group consisting of hydrogen, methyl and ethyl, R is a member selected from the group consisting of methyl and, when $R_1$ is a member selected from the group consisting of methyl and ethyl, hydrogen and Y is a member selected from the group consisting of hydrogen and chlorine.

3. A phenthiazine according to claim 1 wherein R and $R_1$ are hydrogen and Y is chlorine.

4. A phenthiazine according to claim 1 wherein R is a member selected from the group consisting of hydrogen and methyl, $R_1$ is a member selected from the group consisting of hydrogen, methyl and ethyl, and Y is a member selected from the group consisting of methyl and methoxy.

5. A phenthiazine according to claim 1 wherein R is a member selected from the group consisting of hydrogen and methyl, $R_1$ is a member selected from the group consisting of hydrogen and methyl, and Y is a member selected from the group consisting of hydrogen, chlorine, methyl, and methoxy and R is methyl when $R_1$ and Y are both hydrogen.

6. A compound selected from the group consisting of the phenthiazine according to claim 1 wherein R is methyl, and $R_1$ and Y are hydrogen, and a pharmaceutically-acceptable alkali metal, alkaline earth metal, ammonium and amine salt thereof.

7. A compound selected from the group consisting of the phenthiazine according to claim 1 wherein R is methyl, $R_1$ is hydrogen and Y is methoxy, and a pharmaceutically-acceptable alkali metal, alkaline earth metal, ammonium and amine salt thereof.

8. A compound selected from the group consisting of the phenthiazine according to claim 1 wherein R is methyl, $R_1$ is methyl, and Y is hydrogen, and a pharmaceutically-acceptable alkali metal, alkaline earth metal, ammonium and amine salt thereof.

9. A compound selected from the group consisting of a phenthiazine according to claim 1 wherein R is methyl, $R_1$ is methyl, and Y is methoxy, and a pharmaceutically-acceptable alkali metal, alkaline earth metal, ammonium and amine salt thereof.

References Cited

Burger et al., J. Org. Chem., vol. 19, p. 1841–42 (1954).

NORMA S. MILESTONE, *Primary Examiner.*

H. I. MOATZ, *Assistant Examiner.*

U.S. Cl. X.R.

260—141, 349, 465, 470, 558, 571, 592, 609; 424—247